Jan. 21, 1969     B. O. AYERS     3,422,664

CHROMATOGRAPHIC METHOD OF ANALYSIS AND APPARATUS THEREFOR

Filed July 19, 1965

INVENTOR

B.O. AYERS

BY *Young & Quigg*

ATTORNEYS

United States Patent Office 3,422,664
Patented Jan. 21, 1969

3,422,664
CHROMATOGRAPHIC METHOD OF ANALYSIS
AND APPARATUS THEREFOR
Buell O. Ayers, Bartlesville, Okla., assignor to Phillips
Petroleum Company, a corporation of Delaware
Filed July 19, 1965, Ser. No. 472,788
U.S. Cl. 73—23.1  3 Claims
Int. Cl. G01n 31/08

ABSTRACT OF THE DISCLOSURE

In a chromatographic analysis, a volatile liquid sample is mixed with an inert gas in such concentration that each constituent of the sample is below the dew point concentration at the operating temperature of the chromatographic column. A portion of the resulting mixture is employed as sample to the column.

---

Figure 1:
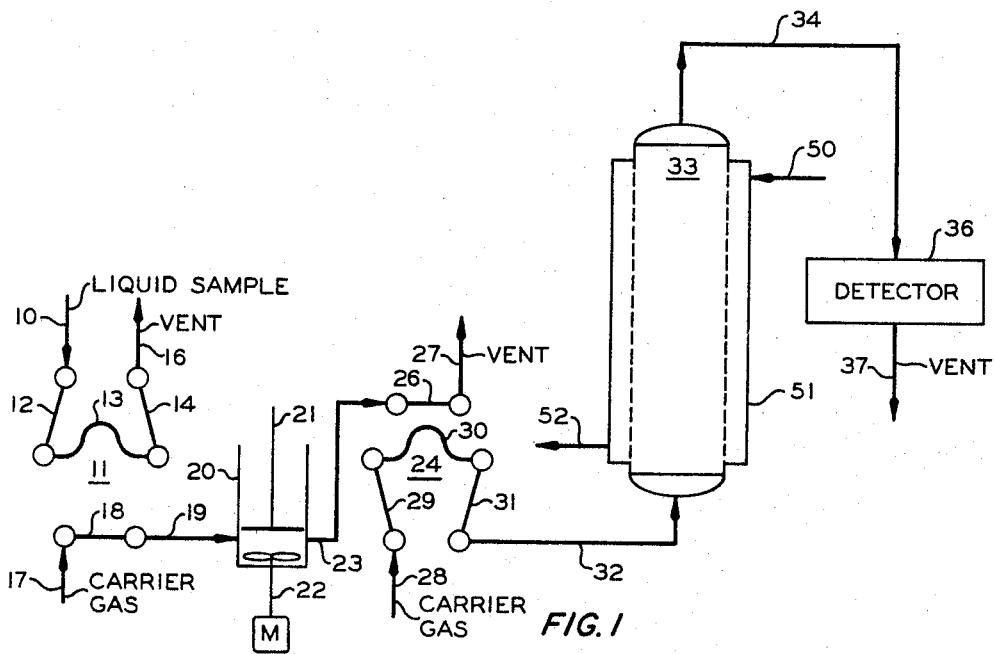

This invention relates to an improved method and apparatus for the chromatographic analysis of fluids. In another aspect, this invention relates to a method and apparatus for the vaporous chromatographic analysis of fluids wherein the chromatographic column is operated at a reduced temperature. In yet another aspect, this invention relates to a method and apparatus for obtaining a vaporous sample to be analyzed in a chromatographic analyzer.

A conventional method for the determination of the concentration of constituents in a fluid mixture involves the use of a chromatographic analyzer. In chromatography, a sample of the material to be analyzed is introduced as a vapor into a column containing a selective sorbent or partitioning material. A carrier gas is directed into the column so as to force the sample material therethrough. The selective sorbent or partitioning material tends to hold the constituents of the vaporous sample. This results in the several constituents of the vaporized sample mixture flowing through the column at different rates of speed, depending upon their affinities for the packing or partitioning material. The column effluent thus consists essentially of the carrier gas alone, the individual constituents of the sample mixture appearing later at spaced time intervals. A conventional method for detecting the presence and concentration of these constituents is to compare the thermal conductivity of the column effluent gas with the thermal conductivity of the carrier gas directed to the column.

In the analysis of high-boiling sample mixtures by conventional chromatographic methods of analysis, it is necessary that the chromatographic column be operated at a relatively high temperature. Partitioning materials employed in the chromatographic column have a tendency to become unstable at these higher temperatures fluid mixtures wherein the operating temperature of the chromatographic column.

Accordingly, an object of my invention is to provide an improved chromatographic method and apparatus therefor.

Another object of my invention is to provide a chromatographic method and apparatus for the analysis of fluid mixtures wherein the operating temperature of the chromatographic column is substantially reduced.

Another object of my invention is to provide an improved method and apparatus for the chromatographic analysis of relatively high-boiling fluid mixtures.

Another object of my invention is to provide an improved method and apparatus for obtaining a vaporous sample of a liquid mixture to be analyzed in a chromatographic analyzer.

Other objects, advantages and features of my invention will be readily apparent to those skilled in the art from the following description, the drawing and appended claims.

By my invention, I have provided a chromatographic method of analysis and apparatus therefor wherein a volatile liquid mixture is mixed with an inert gas to provide a resultant vaporous mixture wherein the concentration of each constituent of the volatile liquid mixture is below the dew point concentration at the operating temperature of the chromatographic column; and a portion of the resultant vaporous mixture is passed to a chromatographic column containing a partitioning material and operated at a temperature substantially below the dew point of the undiluted sample.

The invention broadly is applicable to the analysis of liquid mixtures capable of being volatilized. The invention is particularly applicable to relatively high-boiling volatile liquid mixtures such as hydrocarbon liquid mixtures containing $C_9$ and heavier hydrocarbons.

By my invention, wherein the chromatographic column is operated at a substantially lower temperature than could normally be employed in the analysis of the sample liquid mixture, improved resolution of the resulting chromatographic peaks is obtained. By operating the chromatographic column at a lower temperature, members of the same homologous series of, for example, the high-boiling hydrocarbons, are more easily separated within the chromatographic column. By my invention, problems of metering very small volumes of liquid are eliminated and, as heretofore noted, the lower chromatographic column operating temperatures made possible by the invention increase the stability of partitioning materials employed. Operating the chromatographic column at the lower temperature permits more efficient and more rapid chromatographic separations.

FIGURE 1 is a schematic representation of one embodiment of the invention with sample valves 11, 24 and mixing chamber 20 in a first position.

Figure 2:
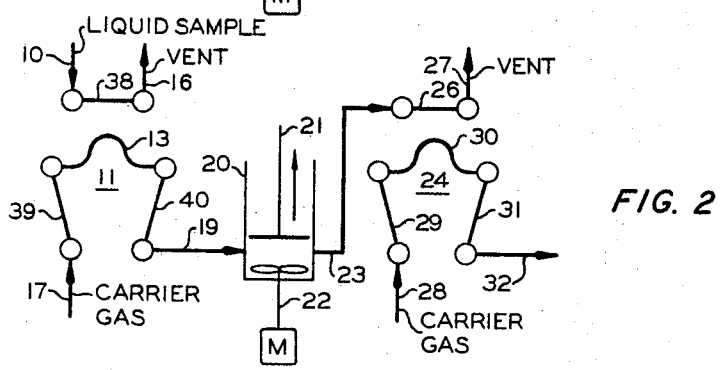
Figure 3:
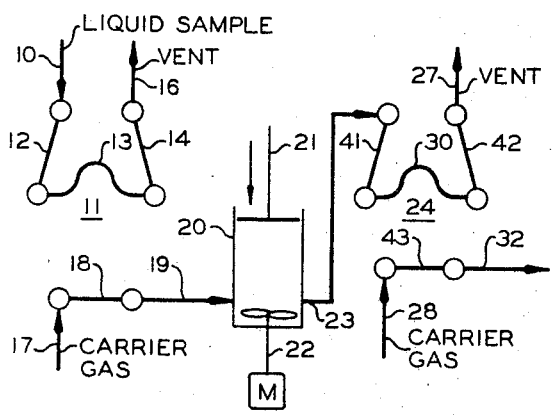

FIGURES 2 and 3 illustrate the invention with respect to subsequent positions of valves 11, 24 and mixing chamber 20.

Referring to the drawing and more particularly to FIGURE 1, a liquid sample capable of being volatilized is passed via conduit means 10 to a multi-port sample valve means 11. Although not to be limited thereto, a suitable multi-port sample valve means is described in U.S. Patent No. 3,111,849. The liquid sample mixture is passed through valve means 11 via conduit means 12 to a sample loop 13 positioned within valve means 11. The liquid sample mixture is passed from sample valve means 11 via conduit means 14 to a vent conduit means 16.

A carrier gas, inert to the chromatographic separation process, such as helium, hydrogen or nitrogen, is passed via conduit means 17 to sample valve means 11 and from sample valve means 11 via conduit means 18 and conduit means 19 to a conventional mixing chamber 20. Mixing chamber 20 can be any conventional mixing chamber means for mixing a metered amount of a liquid sample mixture with a measured quantity of gas passed thereto so as to provide a resultant vaporous mixture having a controlled concentration of the sample mixture. As illustrated, mixing chamber 20 contains a movable piston means 21 operably connected to a driving means not herein illustrated. Predetermined positions of the maximum stroke of the piston 21 will determine the proper amounts of carrier gas admitted to chamber 20 for different samples and/or concentrations. Positioned in the lower region of mixing chamber 20 is a conventional mixing means such as a stirrer 22. In the position illustrated in FIGURE 1, the carrier gas is passed into mixing chamber 20 and withdrawn from mixing chamber 20 via conduit means 23 and passed to a multi-port sample valve means 24. Sample valve means 24 can be as described with respect to sample valve means 11. The carrier gas is passed through sample valve means 24 via conduit means 26 to a vent conduit means 27.

An inert carrier gas, which can be the same or a different carrier gas than that passed to sample valve means 11, is passed via conduit means 28 to sample valve means 24. The carrier gas is passed through sample valve means 24 via conduit means 29, sample loop conduit means 30 and conduit means 31. The carrier gas is withdrawn from sample valve means 24 via conduit means 32 and passed to a chromatographic column 33.

Chromatographic column 33 contains a partitioning material capable of selectively retarding the flow through said partitioning material of the constituents of a vaporous sample mixture directed thereto. An effluent mixture is withdrawn from column 33 via conduit means 34 and passed to a conventional detector means 36. Although not to be limited thereto, detector means 36 is preferably a high sensitivity detector such as the hydrogen flame ionization detector capable of accurately determining the concentrations of constituents of very low concentration in the vaporous mixture passed to column 33. The effluent mixture is withdrawn from detector 36 via vent conduit means 37.

After the mixing valve 20, sample loop 30 and column 33 have been flushed as illustrated in FIGURE 1, valve means 11 and 24 are positioned as illustrated in FIGURE 2. The positioning of valve means 11 and 24 and operation of mixing chamber 20 can be controlled by a timing means not herein illustrated. Conventional timing means provide output signals providing for sequence operation. Such timing means can be any type of apparatus known in the art for providing control signals in the desired sequence. One common type of timer which can be employed utilizes a series of cam operated switches wherein associated cams are rotated by a timing motor.

In FIGURE 2, the liquid sample mixture is passed via conduit means 10 to sample valve means 11 and from sample valve means 11 via conduit means 38 and vent conduit means 16. The carrier gas is passed via conduit means 17 to sample valve means 11 and to the sample loop means 13 via conduit means 39. The carrier gas containing a measured volume of sample liquid mixture is passed from sample valve means 11 via conduit means 40 and conduit means 19 to mixing chamber 20.

As illustrated, the carrier gas containing the liquid sample moves piston 21 upwardly to a predetermined position to provide within mixing chamber 20 a measured volume of carrier gas containing a measured volume of liquid sample mixture. The liquid and carrier gas mixture within chamber 20 is mixed by stirring means 22 to provide a resultant vaporous mixture wherein the concentration of each constituent of the volatilized liquid is below the dew point at the operating temperature of chromatographic column 33. Although not to be limited thereto, the liquid is preferably mixed with the carrier gas in mixing chamber 20 in such proportions so as to provide a concentration of the volatilized liquid in the carrier gas wherein the dew point of each constituent of the volatilized liquid is at least 100° C. below the boiling point of the sample liquid mixture.

Carrier gas is passed to valve means 24 via conduit means 28 and from valve means 24 via conduit means 32 to chromatographic column 33 as described in connection with FIGURE 1.

After the mixing step is completed, valves 11 and 24 are positioned as illustrated in FIGURE 3. The sample liquid mixture is passed via conduit means 10 to sample valve means 11 and through sample valve means 11 via conduit means 12, sample loop conduit means 13 and conduit means 14. The liquid sample mixture is withdrawn from sample valve means 11 via vent conduit means 16.

Piston means 21 is caused to move downwardly, as illustrated, by a driving means not herein illustrated. The homogenized carrier gas and volatilized liquid mixture is passed from mixing chamber 20 via conduit means 23 to valve means 24. The vaporous mixture is passed through valve means 24 via conduit means 41, sample loop conduit means 30 and conduit means 42 to vent conduit means 27.

As piston means 21 approaches the position illustrated in FIGURE 1, sample valve means 11 and valve means 24 are positioned as illustrated in FIGURE 1. Carrier gas is passed via conduit means 28 to valve means 24 and to sample loop means 30 within valve means 24 via conduit means 29. Carrier gas containing a fixed measured quantity of the mixture prepared in mixing chamber 20 is passed from valve means 24 via conduit means 31 and conduit means 32 to column 33.

Column 33 is operated at a temperature substantially lower than would be necessary if, for example, the liquid sample mixture was injected into a carrier gas stream by conventional means and the resultant vaporous mixture passed directly to column 33. To illustrate the invention, a chromatographic column employed to analyze a $C_9$ and heavier hydrocarbon mixture would be operated at a temperature in the range of 200–250° F. By operating in the described inventive manner, chromatographic column 33 can be operated at a temperature in the range of 0–50° F., obtaining the advantages of the lower temperature as previously described. Conventionally a chromatographic column employed to analyze a $C_4$–$C_6$ hydrocarbon mixture would be operated at a temperature of about 120° F. By operating according to the invention, chromatographic column 33 can be operated at a temperature of about −25° F.

Chromatographic column 33 can be maintained at a desired temperature by the passage of a heat exchange medium via conduit means 50 to a jacket 51 surrounding column 33. The heat exchange medium can be withdrawn from jacket 51 via conduit means 52.

As will be evident to those skilled in the art, various modifications of this invention can be made, or followed, in the light of the foregoing disclosure, without departing from the spirit or scope thereof.

I claim:
1. A method of analysis which comprises introducing a predetermined quantity of a volatile liquid sample mixture into a mixing zone;
   introducing an inert gas into said mixing zone, the amount of inert gas so introduced being such that the sample mixture is vaporized and the concentration of each constituent of the sample mixture in the resulting vaporous mixture is below the dew point concentration at a first temperature;
   passing a portion of said vaporous mixture from said mixing zone to a chromatographic zone containing a partitioning material that selectively retards the passage therethrough of the constituents of said sample mixture;
   maintaining the temperature of said chromatographic zone at or above said first temperature but below the boiling point of said sample mixture;
   passing a carrier gas through said chromatographic zone to elute the constituents of said sample mixture; and measuring a property of the effluent withdrawn from said chromatographic zone representative of the concentration of said sample constituents contained therein.

2. The method of claim 1 wherein the concentration of each of said constituents of said sample mixture in the resulting vaporous mixture is such that the dew point of each of said sample constituents in said vaporous mixture is at least 100° C. below the boiling point of said sample mixture.

3. The method of claim 2 wherein said sample mixture is a mixture of $C_9$ and heavier hydrocarbons and the chromatographic zone is maintained in the temperature range of 0 to 50° F.

References Cited

UNITED STATES PATENTS 3,169,389   2/1965   Green et al. _____ 73—23.1

OTHER REFERENCES

Text: Gas Liquid Chromatography—Dal Nogare & Juvet, published by Interscience Publr's—1962, pp. 174, 175, 176, 177.

RICHARD C. QUEISSER, *Primary Examiner.*